(12) United States Patent
Bousetouane et al.

(10) Patent No.: US 12,346,874 B2
(45) Date of Patent: Jul. 1, 2025

(54) VISION-BASED SYSTEM AND METHOD FOR PROVIDING INVENTORY DATA COLLECTION AND MANAGEMENT

(71) Applicant: W.W. Grainger, Inc., Lake Forest, IL (US)

(72) Inventors: Fouad Bousetouane, Vernon Hills, IL (US); Ojasve Srikanth, Chicago, IL (US); Shubham Nagarkar, Chicago, IL (US); Toheeb Okenla, South Holland, IL (US); Ling Ouyang, Chicago, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 378 days.

(21) Appl. No.: 17/903,114

(22) Filed: Sep. 6, 2022

(65) Prior Publication Data
US 2024/0078505 A1   Mar. 7, 2024

(51) Int. Cl.
| *G06Q 10/087* | (2023.01) |
| *G06F 3/0482* | (2013.01) |
| *G06Q 30/0601* | (2023.01) |
| *G06V 30/19* | (2022.01) |
| *G06V 30/30* | (2022.01) |

(52) U.S. Cl.
CPC ......... *G06Q 10/087* (2013.01); *G06F 3/0482* (2013.01); *G06V 30/19* (2022.01); *G06V 30/30* (2022.01); *G06Q 30/0633* (2013.01)

(58) Field of Classification Search
CPC .............. G06Q 10/087; G06Q 30/0633; G06F 3/0482; G06V 30/19; G06V 30/30
See application file for complete search history.

(56) References Cited

U.S. PATENT DOCUMENTS

| 8,051,067 | B2 | 11/2011 | Westphal | |
| 10,147,127 | B2 | 12/2018 | Westphal | |
| 10,366,365 | B2 | 7/2019 | Rimnac et al. | |
| 10,977,608 | B2 | 4/2021 | Scheer | |
| 2013/0179468 | A1 | 7/2013 | Westphal | |
| 2014/0156466 | A1 | 6/2014 | Westphal | |
| 2017/0061416 | A1* | 3/2017 | Morate | G06F 16/51 |
| 2018/0060803 | A1* | 3/2018 | Cheruku | G06V 20/52 |
| 2018/0096555 | A1* | 4/2018 | Schtein | G07F 11/007 |
| 2020/0005225 | A1* | 1/2020 | Chaubard | H04N 23/698 |

(Continued)

*Primary Examiner* — A. Hunter Wilder
(74) *Attorney, Agent, or Firm* — Barnes & Thornburg LLP

(57) ABSTRACT

A system and method determines from data collected by one or more data collection elements of a computing device a plurality of discrete product storage locations within a product storage system. Each of the plurality of plurality of discrete product storage locations is caused to be associated with at least one cell of a grid comprised of a plurality of cells. A graphical user interface is displayed in a display of the computing device, the graphical user interface including the grid overlayed upon an image of the product storage system. A user may then interact with the graphical user interface to select a one or more of the plurality of cells of the grid and cause product related information captured via use of the one more data collection elements of the computing device to be linked in a memory storage associated with the computing device to the one of the plurality of discrete product storage locations that was associated with the selected at least one cell of the grid.

15 Claims, 5 Drawing Sheets

(56) References Cited

U.S. PATENT DOCUMENTS

| | | |
|---|---|---|
| 2022/0001279 A1 | 1/2022 | Colenbrander |
| 2022/0012790 A1 | 1/2022 | Colteu et al. |
| 2022/0020758 A1 | 1/2022 | Park et al. |
| 2022/0207585 A1 | 6/2022 | Bousetouane et al. |

* cited by examiner

VISION-BASED SYSTEM AND METHOD FOR PROVIDING INVENTORY DATA COLLECTION AND MANAGEMENT

BACKGROUND

Inventory management systems are generally known in the art. By way of example, U.S. Pat. No. 10,366,365 describes a system and method that uses cameras mounted to storage bins to monitor product inventory levels.

Vision-based product matching systems are also generally known in the art. By way of example, US Publication No. 2022/0012790 describes a system and method that will automatically provide at least part of an image frame captured using a mobile device to a cloud-based visual search process for the purpose of locating one or more matching products from within a product database. Yet further, US Publication No. 2022/0207585 describes a system and method that provides three-dimensional (3D) information for an object of interest captured using a mobile device to a cloud-based visual search process for the purpose of locating one or more matching products from within a product database.

These commonly assigned publications are incorporated herein by reference in their entirety.

SUMMARY

To provide inventory data collection, the following generally describes a system and method that determines from data collected by one or more data collection elements of a computing device a plurality of discrete product storage locations within a product storage system whereupon each of the plurality of plurality of discrete product storage locations is caused to be associated with at least one cell of a grid comprised of a plurality of cells. A graphical user interface is then displayed in a display of the computing device, the graphical user interface including the grid overlayed upon an image of the product storage system. A user may then interact with the graphical user interface to select a one or more of the plurality of cells of the grid and cause product related information captured via use of the one more data collection elements of the computing device to be linked in a memory storage associated with the computing device to the one of the plurality of discrete product storage locations that was associated with the selected at least one cell of the grid.

To provide inventory management, the system and method may also cause the computing device to display in the display a second graphical user interface comprising the grid overlayed upon the image of the product storage system. A user can interact with the second graphical user interface and again select a one or more of the plurality of cells of the grid. The user can then use the data collection elements to cause a product level information for a discrete product storage location corresponding to the selected one or more the plurality of cells of the grid to be captured. The captured product level information can then be compared to a predetermined threshold and the comparison can be used to determine when a product reorder request for product stored within the discrete product storage area is to be automatically sent to an inventory management/fulfillment service.

A better understanding of the objects, advantages, features, properties, and relationships of the hereinafter described systems/methods will be obtained from the following detailed description and accompanying drawings which set forth illustrative examples that are indicative of the various ways in which the principles of the described systems/methods may be employed.

BRIEF DESCRIPTION OF THE DRAWINGS

Example systems and methods for providing vision-based inventory data collection and management will be described hereinafter with reference to the attached drawings in which.

DETAILED DESCRIPTION

The following describes a new and innovative vision-based inventory data collection and management product. The product, preferably provided in the form of an app or the like, is intended to be installed upon and executed by a computing device, such as the example computing device 100 shown in FIG. 1. For ease of description, the product will simply be referred to as an app hereinafter.

Figure 1:
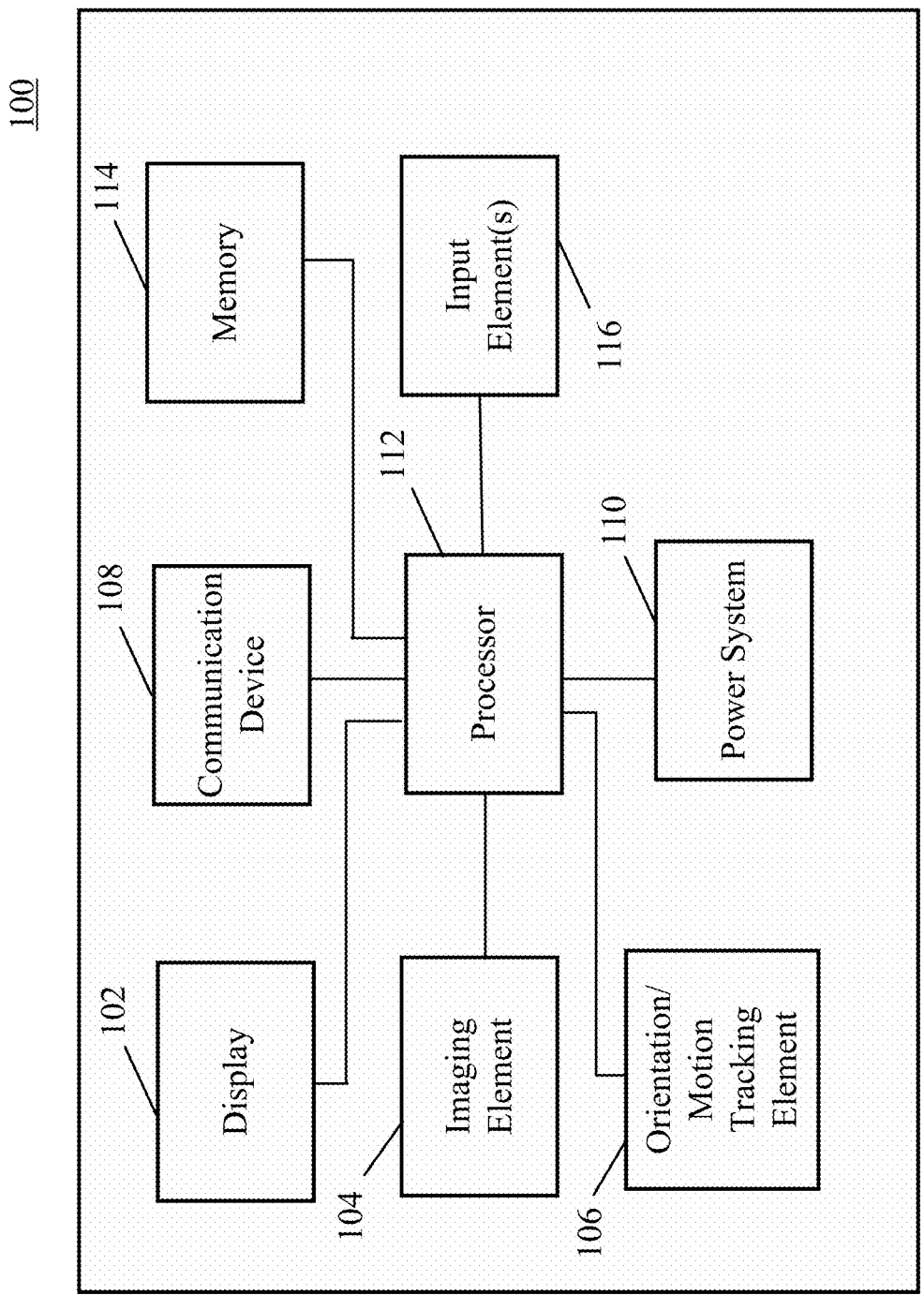
FIG. 1 illustrates an example computing device for use in capturing image information.

Turning now to FIG. 1, the example computing device 100 is in the form of a mobile computing device, e.g., a smartphone, an electronic book reader, or tablet computer. However, it is to be understood that any device capable of receiving and processing input can be used in accordance with the various embodiments discussed herein. Thus, a computing device 100 can include desktop computers, notebook computers, electronic book readers, personal data assistants, cellular phones, video gaming consoles or controllers, television set top boxes, and portable media players, among other devices.

In a preferred example, the computing device 100 has an associated display 102 and one or more data capture elements 104. The display may be a touch screen, electronic ink (e-ink), organic light emitting diode (OLED), liquid crystal display (LC)), or the like element, operable to display information or image content to users of the computing device 100. Each data capture element 104 may be, for example, a camera, a charge-coupled device (CCD), an infrared sensor, a time-of-flight sensor, or other two-dimensional (2-D) and/or three-dimensional (3-D) image capturing technology as needed for a particular purpose. The data capture element(s) 104 and the display 102 can be integrated into the computing device 100 or be releasably couplable to the computing device 100.

As discussed further below, the computing device 100 is to be used to analyze data that is captured about a product storage system and the product that is (or is to be) inventoried in the product storage system. The data can be obtained from a single image or multiple images and the images may be captured periodically or continuously via use of the data capture element(s) 104. The computing device 100 can include the ability to start and/or stop image capture, e.g., stop the visual processing, such as when receiving a command from a user, application, or other device. The processing of the data captured via use of the data capture element(s) 104 is preferably processed locally on the computing device 100. The processing of the data obtained using the data capture element(s) 104 can also be processed in whole or in part on a remote device, such as a cloud-based server device, that is coupled to the computing device 100 as needed.

While not required, the computing device 100 may also include one or more orientation-determining and/or position-determining elements 106 operable to provide information such as a position, direction, motion, and/or orientation of the computing device 100. These elements can include, for example, accelerometers, inertial sensors, electronic gyroscopes, gps systems, and/or electronic compasses without limitation. Meanwhile, for communicating data to remotely located processing devices, such as one or more cloud-based computing servers, the computing device 100 preferably includes at least one communication device 108, such as at least one wired or wireless component operable to communicate with one or more electronic devices, such as a cell tower, wireless access point ("WAP"), computer, or the like.

As yet further illustrated in FIG. 1, the above-described components (and other components as needed) are coupled to a processing unit 112 which will execute instructions, including the instructions associated with the subject app, that can be stored in one or more memory devices 114. As will be apparent to one of ordinary skill in the art, the computing device 100 can include many types of memory, data storage, or computer-readable media, such as a first data storage for program instructions for execution by the processing unit(s) 112, the same or separate storage for images or data, a removable memory for sharing information with other devices, etc.

To provide power to the various components of the computing device 100, the computing device 100 also includes a power system 110. The power system 110 may be a battery operable to be recharged through conventional plug-in approaches, or through other approaches such as capacitive charging through proximity with a power mat or other such device.

The computing device 100 includes one or more input devices 116 able to receive conventional input from a user. An input device 116 can include, for example, a push button, touch pad, touch screen, wheel, joystick, keyboard, mouse, keypad, camera, or any other such device or element whereby a user can input a command to the device. These I/O devices can be directly connected to the processing device 112 via use of a bus or can be connected to the computing device 100 by a wireless infrared, Bluetooth®, or other link. Some computing devices 100 also can include a microphone or other audio capture element that accepts voice or other audio commands. As will be appreciated, the input device 116 can, among other things, be used to launch the app, interact with a graphical user interface provided by the app, and to close the app as desired.

Turning to FIGS. 2A-2E, 3A, 3B, and 4, methods for generally using the app to help a user collect information about a layout of a product storage system and information about the product inventoried with the product storage system are now described.

As to collecting information about a layout of a product storage system, it is recognized that there are multiple different ways in which product may be stored. Accordingly, the app is trained to determine from the data captured via use of data capture element(s) 104 a layout of the product storage system of interest, i.e., the product storage system that was imaged using one or more data capture elements 104. By determining the layout of the product storage system, the app will also determine the discrete product storage areas within the product storage system. By way of example, such discrete product storage areas may correspond to bins within a product storage rack, coils within a vending machine, or the like without limitation. In addition to being trained to determine a layout of a product storage system, the app is trained to identify product that is stored (or is to be stored) within discrete product storage areas of the product storage system. Furthermore, the app may be trained to identify a level of product inventory within a discrete product storage area of the product storage system. The processes of the app that will use these trained models, i.e., the models for use in identifying product storage system layout, product, and/or product inventory levels, preferably reside entirely on the computing device 100 and, as such, the model(s) used in connections with such processes will generally be shrunk/compressed as needed to meet the capabilities of a given computing device 100 platform. However, to the extent a system operator is not willing to sacrifice the accuracy that is provided by unscaled model(s), data processing can be performed in whole or in part on one or more remote computing devices couplable to the computing device 100, such as a cloud-server, as needed.

Figure 4:
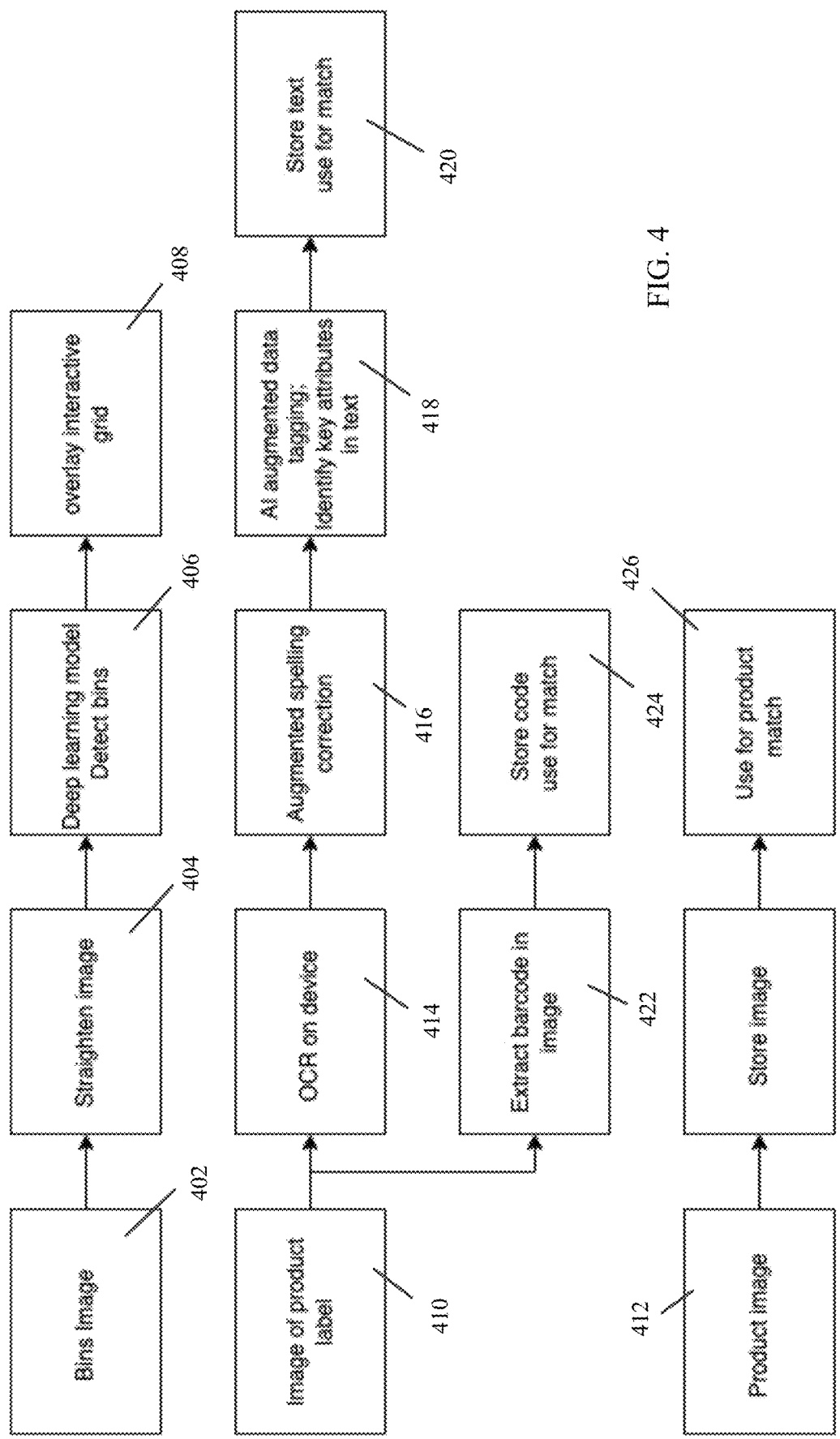

To determine the discrete storage areas with a given storage system, the app may use a process as illustrated in FIG. 4. In the example process illustrated in FIG. 4, once an image of a product storage system, e.g., a product storage rack, is captured 402 using one or more data capture elements 104 of computing device 100, the captured image may be scaled, oriented, or the like 404 as required to generally standardize the image for processing by one or more trained storage system layout detection models, which models preferably include at least a trained edge detection model that is used to determine the locations, boundaries, and possibly dimensions of the discrete storage areas within the storage system. The image of the storage system may be captured and processed using the tap-less method described in US Publication No. 2022/0012790 or may be captured using an otherwise conventional image capturing method that requires a user to interact with a user interface element of the app.

Figures 2A, 2B, 2C, 2D, 2E:
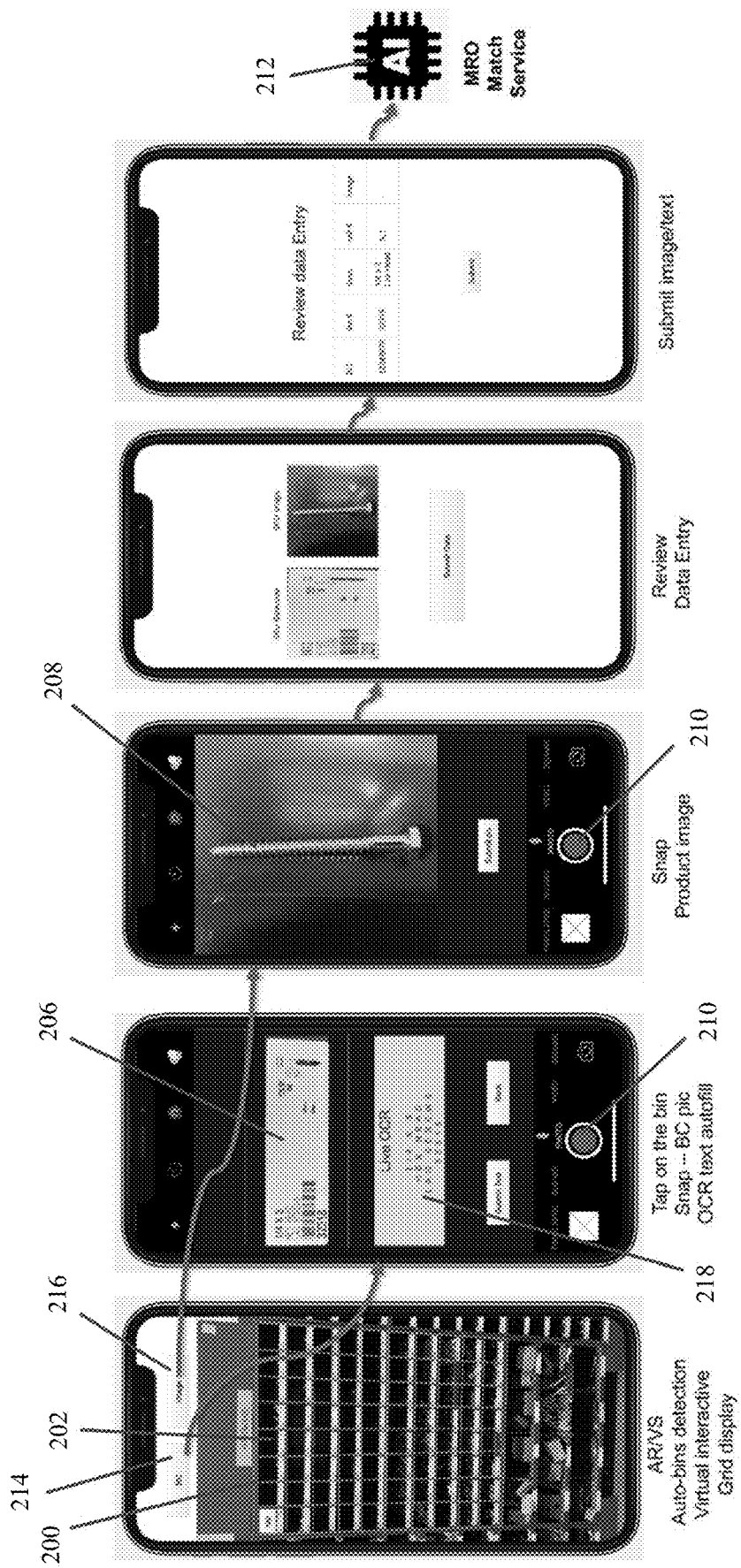
FIGS. 2A-2E, 3A, 3B, and 4 illustrate steps of an example method for collecting inventory storage data.
Figures 3A, 3B:
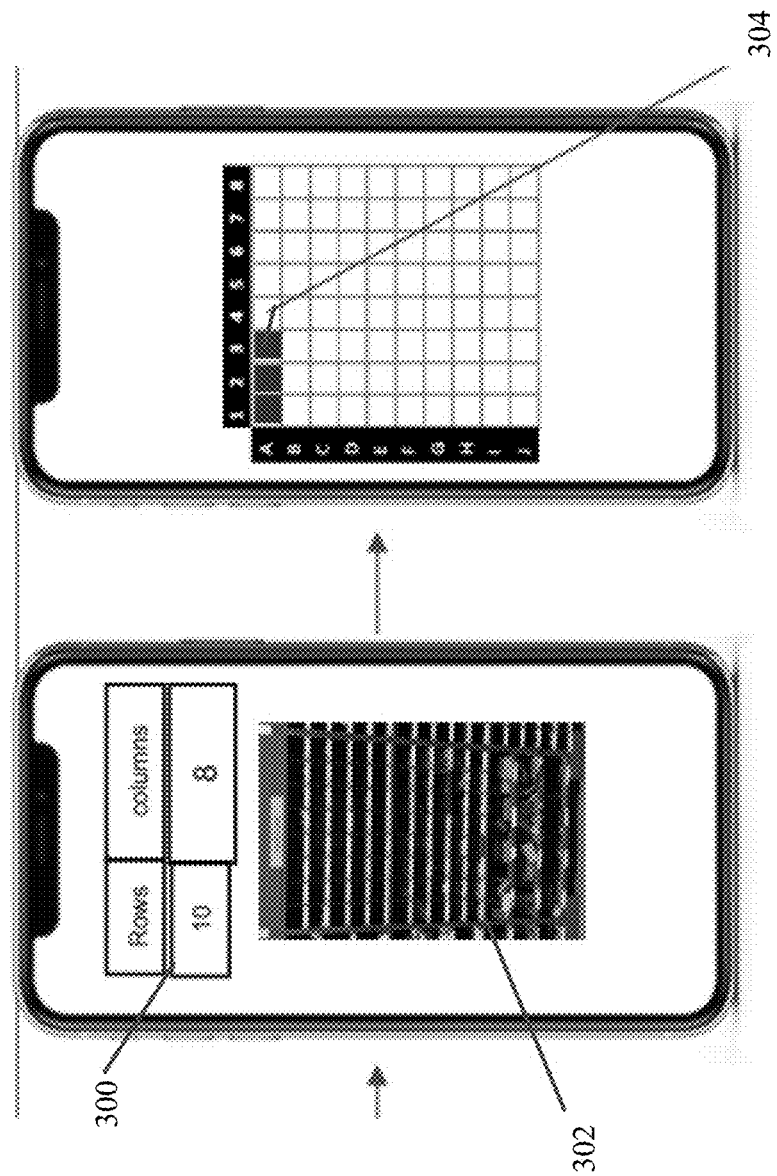

Once the layout for the product storage system is determined, the app will cause an interactive grid to be created for the product storage system. As described further below, the grid is be overlayed over an image of the product storage system as displayed in the display 102 of computing device 100. The grid 200 includes a plurality of cells 202 and one or more of the cells 202 correspond to one or more of the detected product storage areas of the product storage system as illustrated in FIG. 2A. The displayed grid and underlying image can be used to provide a graphical user interface for the app as described further below.

In connection with creating the grid 200, the app preferably assigns to each of the cells 202 a unique identifier. The unique identifier preferably indicates/identifies a specific product storage system within a facility of a customer and a specific discrete product storage area within that product storage system. Without limitation, the identifier for the storage system may be an exact location, such as a geolocation for the storage system within a customer facility, may be a relative location for the storage system within a customer facility, may be a user defined label applied to the storage system, or the like without limitation. Similarly, the identifier for the discrete product storage area, such as a bin in a storage rack, a coil in a vending machine, etc., may be an exact location for the storage area within the storage system, may be a relative location for the storage area within a storage system, may be a user defined label applied to the storage area, or the like without limitation. The identifiers are preferably auto-generated by the system and, as described further below, will be used in connection with storing information about product that is or is to be stored in such storage areas.

In some instances the app may additionally or alternatively allow a user to manually define/refine the grid corresponding to the discrete product storage areas within a product storage system. To this end, a user may, as shown in FIG. 3, define 300 the dimensions of the grid 200, e.g., indicate a number of rows and columns, indicate how 302 that defined grid is to be overlayed upon an image of a product storage system displayed in display 102, and how 304 the cells of the defined grid are to correspond to a discrete storage area of the product storage system. The user may use touch and gesture input upon a touch screen or any other input mechanisms to interact with the graphical user interface that is provided by the app for this purpose. The labels that are to be associated with each discrete product storage area may thereafter be auto-generated or user-generated as desired. It will also be appreciated that any user information provided as a part of these processes can be captured for later use in refining the models used by the app.

Once the grid layout of the storage system is automatically determined and/or manually defined by the user, the app then proceeds to capture and collect product data as further shown in FIG. 4. To this end, the system may indicate to a user a discrete product storage area for which product data is to be collected, for example by highlighting a cell within the overlayed grid as a guide for a user to select that discrete product storage area for further processing. The user may also be allowed to freely select one or more of the discrete product storage areas for processing, for example by a user interacting with the overlayed grid by touching, tapping, gesturing, etc. upon the display 102. The app may allow for the user to zoom the displayed grid and product storage image to thereby allow easier user interaction with the graphical user interface provided by the app.

Once the user has selected/indicated to the app the product storage area of the storage system that is of interest (if required), the app may instruct the user to commence the capture of product information by using one or more of the image input elements 104. The app may verbally instruct the user to capture one or more product related images, may provide text instructions to the user to capture one or more product related images, or may simply cause an image capture related screen to be presented in the display 102 of the computing device 100. Preferably, for a product storage area of interest, it is desired that an image of any physical labels 206 of the storage system that are associated with the storage location of interest be captured 410 and that the physical product 208 stored in the storage location of interest is imaged 412 to capture 2-D and/or 3-D image information for the product as shown in FIGS. 2B and 2C. The user interface may further provide input elements 214 and 216 by which the user can indicate to the system that the image to be captured is a one of the label or the product. The user may be required to manually instruct the camera to capture image information, for example by tapping on a camera user interface element 210, or the system may automatically capture the image information as described in incorporated US Publication No. 2022/0012790.

To process the data obtained from a label, the app may use 414 optical character recognition (OCR) to identify and process any text on the label. As required, text identified using OCR can be spell checked and corrected 416, for example using a trained spell check/correction model, and the augmented/corrected textual data can be parsed 418 for the purpose of identifying any keywords, such as a word that would be used to define an attribute of a product. The keywords may define product type, product manufacture, product brand, product size/dimensions, product color, and the like without limitation. The app may also present a view 218 of the OCR text as it is being processed. The product information collected using OCR is preferably linked 420 to the discrete product storage area, for example, by being cross-referenced in the memory to the unique identifier provided to the cell that is associated with that discrete product storage area. In a similar manner, if the label has a barcode, QR code, or the like, an image of the barcode, QR code, or the like can be extracted 422 from the image of the label and processed (if possible), with the processed data likewise being cross-referenced in the memory to the unique identifier provided to the cell that is associated with that discrete product storage area.

The image for the product itself may be processed as described in incorporated U S Publication No. 2022/0012790 and/or US Publication No. 2022/0207585 to discern a match for the product. The matching product information is also preferably linked to the discrete product storage area, for example, by being cross-referenced in the memory to the unique identifier provided to the cell that is associated with that discrete product storage area.

As shown in FIGS. 2D and 2E, a user may be provided with the details of the information discerned via use of OCR, barcode scanning, and/or the product matching prior to storing such information in memory to thereby allow a user to accept, edit, or reject such information. Interactions with the system by the user at this step may again be captured by the system for use in training any models.

Once the information for each discrete product storage area of the product storage system of interest is collected, the information can be used by a vendor of product to gain insight into the product that is being inventoried at a customer location and how that product is being stored at the customer location. For the benefit of the vendor, this information is preferably to be stored in further cross-reference to the vendor's product information. In the event that the information obtained from the product storage system directly corresponds to the vendor's product information, e.g., the bar code indicates or the OCR collected information includes a stock keeping unit (SKU) used by the vendor, the information need not be processed further, However, in the event the product originated from a different vendor or does not include information otherwise used by the vendor, the information can be provided to a matching service 212 that will function to obtain a vendor SKU for the product. The matching service may use some or all of the product matching functionalities described in commonly assigned U.S. Pat. No. 10,147,127, US Publication No. 2014/0156466, US Publication No. 2013/0179468, and U.S. Pat. No. 8,051,067, which references are incorporated herein by reference in their entirety. The matching service can thus provide a means to cross-reference a barcode, QR code, or SKU (obtained via OCR) of competitor vendor to product sold by the vendor that is operating the subject system and method.

Figure 5:
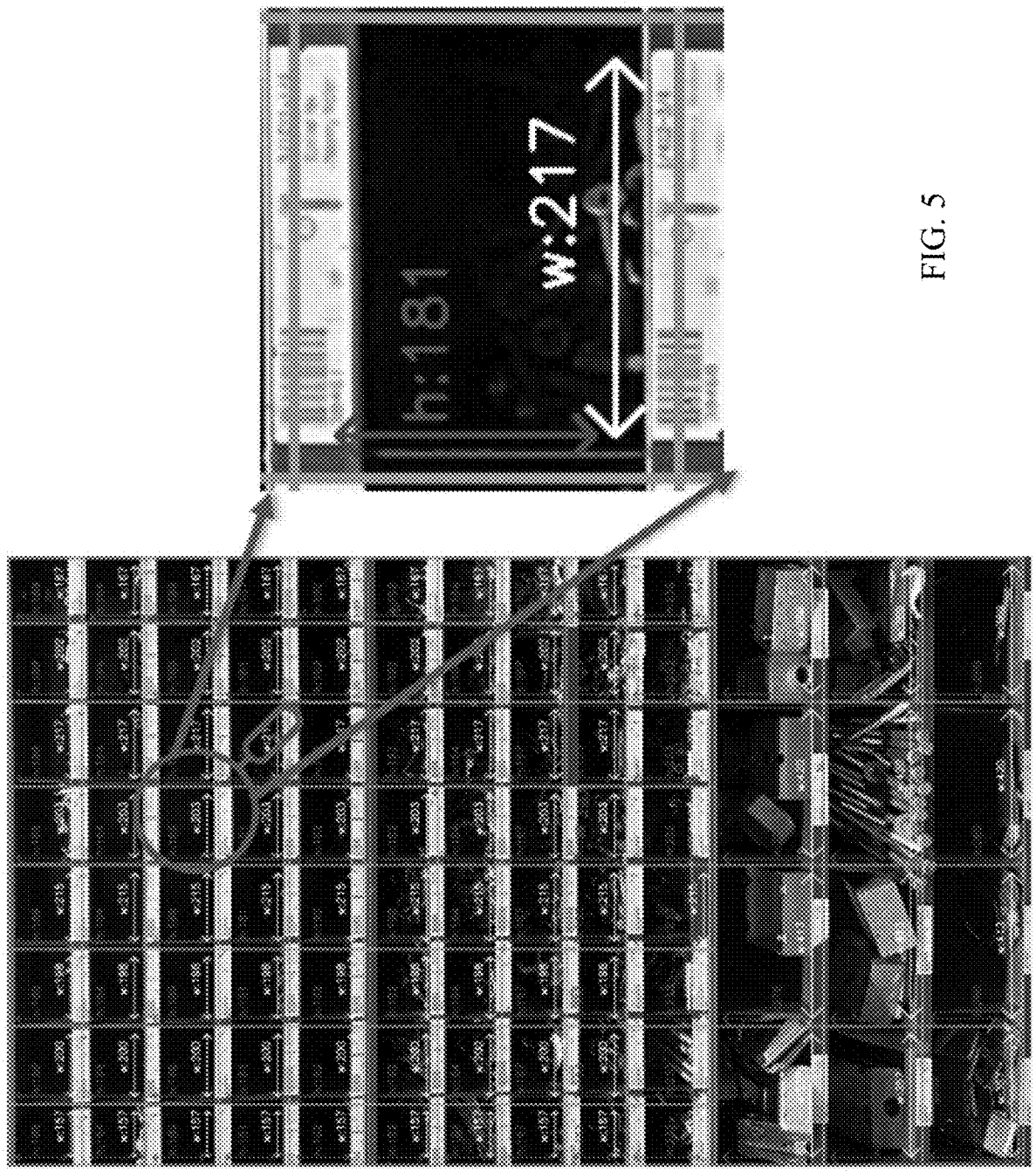
FIG. 5 illustrates an example method for providing inventory management.

Turning to FIG. 5, in a further example the app can be utilized for inventory management purposes. Specifically, once the discrete storage areas of a storage system have been cross-referenced to product and the product has been cross-referenced to a vendor SKU, an image of a discrete product storage area can be utilized to determine if/when product needs to be reordered to restock the discrete storage area. For this purpose, the system may again cause an image of the storage system with an overlayed grid to be presented to the user via use of a graphical user interface provided by the app in the display 102. The user may then indicate a particular cell of the grid with the cell having been previously linked to product and the vendor's SKU for that product. The user may then capture image data for the product as stored in the bin that is associated with the selected cell. The captured image data, preferably 3-D data, is analyzed to estimate how much product is within the bin. The estimation may be performed by using the image data to obtain an estimate of the dimensions of the bin and an estimate of the level of the product in the bin. With such information, coupled with information about the size of the product itself (which information is collectable per the above-described processes), it can be estimated how much product is being stored in the storage system. In this manner, if the estimated amount of product within a discrete storage area of the storage system is at or below a threshold, such as a threshold corresponding to a desired amount of safety stock for the product, the app can cause an order for the product to be automatically placed with an inventory fulfillment system of the vendor for the product. Product that is caused to be reordered can be labeled with or otherwise associated with the unique identifier associated with the cell and such information can be used to guide a product restocker to the exact storage system and the exact storage area that is to receive the replenishing product. Examples of inventory management system that can be used to replenish product can be found in commonly assigned U.S. Pat. Nos. 10,366,365 and 10,977,608 which are incorporated herein by reference in their entirety.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory, computer-readable media having stored thereon instructions, the instructions, when executed by a computing device, cause the computing device to perform steps comprising:
    determining from data collected by one or more imaging elements of the computing device a plurality of discrete product storage locations within a product storage system with a first model trained to determine a layout of the product storage system, wherein each of the plurality of discrete storage locations corresponds to a product, wherein the first model comprises a trained edge detection model;
    causing each of the plurality of plurality of discrete product storage locations to be associated with at least one cell of a grid comprised of a plurality of cells;
    automatically generating a label for each of the plurality of cells of the grid, wherein the label includes information indicative of a location of the product storage system within a customer facility and a location of a corresponding one of the plurality of discrete storage locations within the product storage system;
    displaying in a display of the computing device a first graphical user interface comprising the grid overlayed upon an image of the product storage system;
    receiving via the first graphical user interface a selection of a one or more of the plurality of cells of the grid;
    determining product related information captured via use of the one more imaging elements of the computing device with a second model trained to recognize product related information; and
    causing the product related information to be linked in a memory storage associated with the computing device to the one of the plurality of discrete product storage locations that was associated with the selected at least one cell of the grid.

2. The non-transitory, computer-readable media as recited in claim 1, wherein the instructions cause the computing device to automatically define the grid from an image of the product storage system taken using the one or more of the imaging elements.

3. The non-transitory, computer-readable media as recited in claim 1, wherein the instructions cause the computing device to provide a further user interface to allow a user to define the grid over an image of the product storage system taken using the one or more of the imaging elements.

4. The non-transitory, computer-readable media as recited in claim 1, wherein the location of the product storage system is a relative location.

5. The non-transitory, computer-readable media as recited in claim 4, wherein the location of the corresponding one of the plurality of discrete storage locations is a relative location.

6. The non-transitory, computer-readable media as recited in claim 1, wherein each of the plurality of discrete storage locations corresponds to a product storage bin.

7. The non-transitory, computer-readable media as recited in claim 1, wherein each of the plurality of discrete storage locations corresponds to a vending machine coil.

8. The non-transitory, computer-readable media as recited in claim 1, wherein the product related information captured via use of the one more imaging elements comprises an image of the product that is stored in the corresponding one of the plurality of discrete storage locations of the product storage system.

9. The non-transitory, computer-readable media as recited in claim 1, wherein the product related information captured via use of the one more imaging elements comprises an image of a label that is associated with the corresponding one of the plurality of discrete storage locations of the product storage system.

10. The non-transitory, computer-readable media as recited in claim 9, wherein the instructions cause the computing device to subject the image of the label to an optical character recognition process.

11. The non-transitory, computer-readable media as recited in claim 1, wherein the instructions cause the computing device to provide the product related information captured via use of the one more imaging elements of the computing device to a vendor matching service before linking the product related information in the memory storage associated with the computing device to the one of the plurality of discrete product storage locations that was associated with the selected at least one cell of the grid.

12. The non-transitory, computer-readable media as recited in claim 1, wherein the instructions cause the computing device to display in the display of the computing device a second graphical user interface comprising the grid overlayed upon the image of the product storage system; receive via the second graphical user interface a subsequent selection of a one or more of the plurality of cells of the grid; cause a product level information for a discrete product storage location corresponding to the selected one or more the plurality of cells of the grid captured via use of the one more imaging elements of the computing device to be compared to a predetermined threshold; and use the comparison to determine when a product reorder request for product stored within the discrete product storage area is to be automatically sent to an inventory fulfillment service.

13. A computing device comprising a processor, a display, an imaging element, and a non-transitory, computer-readable storage media having stored thereon a plurality of instructions that, when executed, cause the processor to:
determine from data collected by the imaging element a plurality of discrete product storage locations within a product storage system with a first model trained to determine a layout of the product storage system, wherein each of the plurality of discrete storage locations corresponds to a product, wherein the first model comprises a trained edge detection model;
cause each of the plurality of plurality of discrete product storage locations to be associated with at least one cell of a grid comprised of a plurality of cells;
automatically generate a label for each of the plurality of cells of the grid, wherein the label includes information indicative of a location of the product storage system within a customer facility and a location of a corresponding one of the plurality of discrete storage locations within the product storage system;
display in the display of the computing device a first graphical user interface comprising the grid overlayed upon an image of the product storage system;
receive via the first graphical user interface a selection of a one or more of the plurality of cells of the grid;
determine product related information captured via use of the imaging element of the computing device with a second model trained to recognize product related information; and
cause the product related information captured via use of the imaging element of the computing device to be linked in a memory storage associated with the computing device to the one of the plurality of discrete product storage locations that was associated with the selected at least one cell of the grid.

14. The computing device of claim 13, further comprising a positioning element, wherein the computer-readable storage media further comprises a plurality of instructions that, when executed, cause the processor to receive the information indicative of the location of the product storage system from the positioning element of the computing device.

15. A method comprising:
determining, by a computing device, from data collected by one or more imaging elements of the computing device a plurality of discrete product storage locations within a product storage system with a first model trained to determine a layout of the product storage system;
causing, by the computing device, each of the plurality of discrete product storage locations to be associated with at least one cell of a grid comprised of a plurality of cells;
automatically generating, by the computing device, a label for each of the plurality of cells of the grid, wherein the label includes information indicative of a location of the product storage system within a customer facility and a location of a corresponding one of the plurality of discrete storage locations within the product storage system;
displaying, by the computing device, in a display of the computing device a first graphical user interface comprising the grid overlayed upon an image of the product storage system;
receiving, by the computing device, via the first graphical user interface a selection of a one or more of the plurality of cells of the grid;
determining, by the computing device, product related information captured via use of the one more imaging elements of the computing device with a second model trained to recognize product related information; and
causing, by the computing device, the product related information to be linked in a memory storage associated with the computing device to the one of the plurality of discrete product storage locations that was associated with the selected at least one cell of the grid.

* * * * *